(12) United States Patent
Jannot et al.

(10) Patent No.: US 9,353,660 B2
(45) Date of Patent: May 31, 2016

(54) SCR SYSTEM AND A METHOD OF PURGING IT

(71) Applicant: Inergy Automotive Systems Rsrch. (Societe Anonyme), Brussels (BE)

(72) Inventors: Frederic Jannot, Bousval (BE); Franck Dhaussy, Margny-les-Compiegne (FR); Stephane Leonard, Brussels (BE)

(73) Assignee: Inergy Automotive Systems Research, Brussels (BE)

( * ) Notice: Subject to any disclaimer, the term of this patent is extended or adjusted under 35 U.S.C. 154(b) by 0 days.

(21) Appl. No.: 14/089,068

(22) Filed: Nov. 25, 2013

(65) Prior Publication Data

US 2014/0182271 A1    Jul. 3, 2014

(51) Int. Cl.
*F01N 3/24* (2006.01)
*F01N 3/10* (2006.01)
(Continued)

(52) U.S. Cl.
CPC ............. *F01N 3/10* (2013.01); *F01N 3/2066* (2013.01); *B05B 1/1663* (2013.01); *B05B 1/3006* (2013.01); *B05B 11/3097* (2013.01); *B05B 12/04* (2013.01); *B05B 15/0283* (2013.01); *F01N 3/208* (2013.01); *F01N 2610/02* (2013.01); *F01N 2610/14* (2013.01); *F01N 2610/144* (2013.01);
(Continued)

(58) Field of Classification Search
CPC  B05B 1/1663; B05B 1/3006; B05B 11/3097; B05B 12/04; B05B 15/0283; F01N 3/208; F01N 2610/02; F01N 2610/1406; F01N 2610/144; F01N 2610/1446; F01N 2610/146; F01N 2610/1473; F01N 2610/1493; F01N 2900/1822

USPC ................... 60/274, 286, 295, 296, 301, 322
See application file for complete search history.

(56) References Cited

U.S. PATENT DOCUMENTS

| | | | | |
|---|---|---|---|---|
| 2008/0276601 A1* | 11/2008 | Katou et al. | .................... | 60/287 |
| 2009/0199538 A1* | 8/2009 | Boe et al. | ........................ | 60/274 |

(Continued)

FOREIGN PATENT DOCUMENTS

| | | |
|---|---|---|
| DE | 10 2008 009 650 A1 | 8/2009 |
| DE | 10 2008 000 594 A1 | 9/2009 |

(Continued)

OTHER PUBLICATIONS

French Preliminary Search Report issued Jul. 26, 2013, in French Application No. 12 61346 filed Nov. 28, 2012 (with English Translation of Categories of Cited Documents), 3 pages.

*Primary Examiner* — Jorge Leon, Jr.
(74) *Attorney, Agent, or Firm* — Oblon, McClelland, Maier & Neustadt, L.L.P.

(57) ABSTRACT

There is provided a system for storing and injecting an additive into exhaust gas from an internal combustion engine, the system comprising a tank for storing the additive, an injector, and a pump for driving the additive from the tank to the injector via an injection channel, the system also comprising a purge device mounted between the pump and the injection channel. The purge device comprises a chamber and piston moving equipment slidably mounted in the chamber, the purge device being designed so that:
  movement of the moving equipment in one of its sliding directions causes a passage to open into the chamber for passing the additive to the injection channel; and
  movement of the moving equipment in its other sliding direction creates suction within the chamber, which causes at least some of the additive contained in the injection channel to return into the chamber.

11 Claims, 3 Drawing Sheets

(51) Int. Cl.
  *F01N 3/20* (2006.01)
  *B05B 1/30* (2006.01)
  *B05B 12/04* (2006.01)
  *B05B 11/00* (2006.01)
  *B05B 1/16* (2006.01)
  *B05B 15/02* (2006.01)

(52) U.S. Cl.
  CPC ... *F01N2610/146* (2013.01); *F01N 2610/1406* (2013.01); *F01N 2610/1433* (2013.01); *F01N 2610/1446* (2013.01); *F01N 2610/1473* (2013.01); *F01N 2610/1493* (2013.01); *F01N 2900/1822* (2013.01); *Y02T 10/24* (2013.01)

(56) References Cited

U.S. PATENT DOCUMENTS

| | | | |
|---|---|---|---|
| 2010/0212303 A1* | 8/2010 | Jaulmes et al. | 60/303 |
| 2013/0251546 A1* | 9/2013 | Kellner | 417/53 |
| 2014/0007558 A1* | 1/2014 | Overhoff et al. | 60/274 |

FOREIGN PATENT DOCUMENTS

| | | |
|---|---|---|
| DE | 10 2011 014 026 A1 | 9/2012 |
| EP | 2 447 490 A1 | 5/2012 |
| WO | WO 2012/123051 A1 | 9/2012 |
| WO | WO 2012123051 A1 * | 9/2012 |

* cited by examiner

SCR SYSTEM AND A METHOD OF PURGING IT

CROSS-REFERENCE TO RELATED APPLICATIONS

This application is based upon and claims the benefit of priority to French Application No. 12 61346 filed on Nov. 28, 2012.

FIELD OF THE INVENTION

The present invention relates to an SCR system and to a method of purging such a system.

BACKGROUND OF THE INVENTION

Legislation concerning emissions from motor vehicles and heavy goods vehicles makes provision, amongst other things, for a reduction in the amount of nitrogen oxides NOx released into the atmosphere.

In order to achieve this objective, the selective catalytic reduction (SCR) process is known that enables nitrogen oxides to be reduced by injecting a reducing agent, generally ammonia, into the exhaust line. The ammonia may be obtained by thermolytic decomposition of a solution of an ammonia precursor that may be at eutectic concentration. Such an ammonia precursor is generally a solution of urea.

With the SCR process, the high levels of NOx given off by an engine during combustion at optimized efficiency are treated on leaving the engine in a catalytic unit. Such treatment requires the use of a reduction agent at a precise concentration level and of very good quality. The solution is thus measured out accurately and injected into the exhaust gas stream, where it is hydrolyzed prior to converting nitrogen oxide (NOx) into nitrogen ($N_2$) and water ($H_2O$).

To do this, it is necessary to fit vehicles with a tank containing a solution of additive (generally urea), together with a device for measuring out and injecting the desired quantity of additive into the exhaust line.

Given that the aqueous solution of urea that is generally used for this purpose (eutectic at 32.5% by weight of urea) freezes at −11° C., it is necessary to provide a heater device in order to liquefy the solution so as to be able to inject it into the exhaust line when starting under freezing conditions.

In addition, in order to facilitate operation, in order to facilitate restarting the system after freezing, and in order to avoid bursting the often flexible pipes that convey the urea, it is advantageous to purge the pipes at the end of operation of the system. In addition, it is advantageous to purge the injection line (also referred to as the injection channel) connecting the additive tank to the injector.

In the prior art, various purge devices have been provided for this purpose.

For example, an SCR system has been proposed in which the line(s) is/are purged by sucking exhaust gas through the injector with the help of the pump of the system, which for this purpose either operates in the reverse direction or else is associated with a valve enabling flow to be reversed. Thus, that type of known purge device requires either a bidirectional pump (or two pumps each operating in a direction opposite from the other), or else a 4/2 valve (i.e. a valve with 4 ports and 2 positions) controlled electrically by a computer. That type of known device is particularly complex and expensive.

OBJECT AND SUMMARY OF THE INVENTION

The present invention seeks to solve that problem by proposing a purge device of great simplicity that makes it possible to purge the injection channel and/or the injector in effective manner.

Specifically, the invention relates to a system for storing and injecting an additive into exhaust gas from an internal combustion engine, said system comprising a tank for storing the additive, an injector, and a pump for driving the additive from the tank to the injector via an injection channel, said system also comprising a purge device mounted between the pump and the injection channel. The purge device is such that it comprises a housing defining at least a chamber and piston moving equipment slidably mounted in the chamber, the purge device being designed so that:

- movement of the moving equipment in one of its sliding directions causes a passage to open into the chamber for passing the additive to the injection channel; and
- movement of the moving equipment in its other sliding direction creates suction within the chamber, which causes at least some of the additive contained in the injection channel to return into the chamber.

The additive in question in the context of the invention is preferably a reducing agent suitable for reducing the NOx present in the exhaust gas of an internal combustion engine. It is advantageously ammonia that is used directly (presenting drawbacks in terms of associated safety and corrosion) or else that is generated in situ, within the exhaust gas, starting from a precursor such as urea (which serves to avoid the above-mentioned drawbacks). The invention gives good results with urea, and in particular with aqueous solutions of urea. Eutectic solutions (comprising 32.5% by weight of urea) are very suitable.

The present invention may be applied to any internal combustion engine likely to generate NOx in its exhaust gas.

The system of the invention comprises at least one tank for storing the additive and at least one injection channel (or line) for taking the additive to an exhaust pipe of the engine. At its end, this channel is provided with an injector serving to inject the additive into the exhaust gas.

The system of the invention also has a pump for taking the additive from the additive tank to the injector. The pump may be situated in the additive tank (with the advantage of constituting together therewith a module that is compact and integrated) or else, given the corrosive environment, it may be situated outside the additive tank. Its component materials are preferably selected from materials that withstand corrosion (certain grades of stainless steel and of aluminum, in particular).

Usually, the system of the invention includes a computer connected to the injector and enabling the required quantity of additive to be injected into the exhaust gas (where the quantity required is in particular a function of the following parameters: rate of emission and of conversion of NOx; temperature and pressure; engine speed and load; . . . ).

The purge device of the invention relies on using piston moving equipment slidably mounted in a chamber. The chamber advantageously has an inlet communicating with the pump and an outlet communicating with the injection channel. The moving equipment is capable of performing a go stroke in a first sliding direction and a return stroke in a second sliding direction (opposite to the first direction). During the go stroke, the moving equipment puts the inlet and the outlet of the chamber into communication. Thus, the additive delivered by the pump can flow to the injection channel. During its return stroke, the moving equipment closes off communication between the inlet and the outlet of the chamber and creates suction within the chamber. This causes the additive contained in the injection channel to return into the chamber. Partial purging is thus achieved under the effect of the moving equipment moving in the chamber. In a preferred manner, during purging the pump is stopped and the injector is opened. Stopping of the pump and opening of the injector are performed sequentially.

Preferably, the pump is stopped, pressure is released, and then the injector is opened.

The moving equipment is caused to move automatically and entirely mechanically. As explained below in this document, the moving equipment can move in the second sliding direction under thrust delivered by a resilient element for accumulating and restoring energy. Under such circumstances, the present invention proposes a purge device that is "passive", i.e. a purge device that operates without any electrical power supply or any control signal coming from the computer (or any other control unit).

In the present invention, purging is initiated by stopping the engine, and more particularly stopping the pump. In an advantageous configuration of the invention, when the pump is in operation, additive penetrates into the chamber and pushes the moving equipment in the first sliding direction. When the pump is stopped, the moving equipment of the invention begins to move in the second sliding direction (opposite to the first direction). Thereafter, the injector is opened to admit air into the injection channel and thus allow the moving equipment to continue its stroke (return stroke) in the second sliding direction. Movement of the moving equipment is thus controlled in simple and automatic manner. The direction in which the moving equipment moves is determined by the (on/off) operating state of the pump and by the (open/closed) operating state of the injector. The time lapse between the instant when the pump is stopped and the instant when the injector is opened is preferably very short.

In a particularly advantageous embodiment, the moving equipment comprises a piston mounted to slide in the chamber against at least one spring. The purge device of the invention is thus simple to fabricate and easy to install. It also has the advantage of being compact.

The piston is preferably a sealing piston. The piston is mounted in the chamber so as to be capable of defining a first volume and a second volume inside the chamber. The movement of the piston in one of the sliding directions gives rise simultaneously to an increase in the first volume of the chamber and to a decrease in the second volume of the chamber, and vice versa when the piston moves in the other sliding direction. In a particular embodiment, the spring has a first end secured to at least a portion of the piston and a second end secured to at least a portion of the housing (that defines the chamber). When the pump is in operation, the additive penetrates into the first volume of the chamber and pushes the piston in one of the sliding directions. The movement of the piston in one of the sliding directions causes the spring to shorten (the spring accumulates energy). When the pump stops, the spring tends to return to its original shape (the spring restores the energy it has accumulated). The piston is then pushed in the other sliding direction. Under the effect of the piston moving in the other sliding direction, the sealed piston acts like a syringe, and the additive contained in the injection channel is sucked into the second volume of the chamber. Thereafter, the injector is opened in order to admit air into the injection channel. The volume of air sucked in via the injection channel is substantially equal to the second volume moved by the piston in the chamber. In this way, it is possible for the injection channel (and the injector) to be purged at least in part and quickly.

Advantageously, the assembly formed by the piston and the spring is dimensioned in such a manner that it compensates for the pulsations that might be generated by the pump and/or the injector. Thus, this piston/spring assembly acts like a hydraulic damper.

In an advantageous embodiment, the system includes an additive return circuit enabling the additive contained in the chamber to return into the tank when the moving equipment moves in the other sliding direction.

As explained above, the moving equipment makes it possible to define a first volume and a second volume inside the chamber. During purging, i.e. when the moving equipment is moving in the other sliding direction (return stroke), the second volume in the chamber increases and the first volume in the chamber decreases. The second volume fills with the additive coming from the injection channel and the moving equipment pushes the additive contained in the first volume towards the tank via the return circuit provided for this purpose.

In a first embodiment, the pump presents a predetermined leakage rate. Under such circumstances, the additive contained in (the first volume of) the chamber can return into the tank via the pump itself. For example, such a leakage rate may be determined as a function of the time allowed for filling the second volume of the chamber after opening the injector.

In a second embodiment, the additive return circuit comprises a bypass line. Under such circumstances, the additive contained in (the first volume of) the chamber can return to the tank via such a bypass line. This bypass line thus serves to bypass the pump.

Advantageously, the pump is a unidirectional pump, i.e. it operates to create a flow in a given direction (the additive feed direction). This type of pump is inexpensive and simple to control.

The present invention also provides a method of storing and injecting an additive into an exhaust pipe of an internal combustion engine, the method consisting essentially in driving an additive stored in a tank to an injector with the help of a pump and via an injection channel, and injecting it into the exhaust pipe with the help of the injector. The method also consists of purging the injection channel by moving piston moving equipment that is slidably mounted in a chamber, the movement of the moving equipment in the chamber being suitable for creating suction within the chamber, thereby causing at least some of the additive contained in the injection channel to return into the chamber.

This method is advantageously used when the additive is an aqueous solution of urea.

In a particular implementation, purging comprises the following steps in succession and in this order:

a) starting the pump in order to move the moving equipment in one of the sliding directions;

b) stopping the pump so as to allow the moving equipment to move under its own drive in the other sliding direction; and c) opening the injector to admit air into the injection channel, so that the moving equipment continues to move in the other sliding direction.

Advantageously, the additive contained in the injection channel is sucked into the chamber, during steps b) and c).

BRIEF DESCRIPTION OF THE DRAWINGS

Other characteristics and advantages of the invention appear on reading the following description given by way of non-limiting indication and with reference to the accompanying drawings, in which.

In these figures, identical numbers are used to designate identical elements.

MORE DETAILED DESCRIPTION

Figure 1:
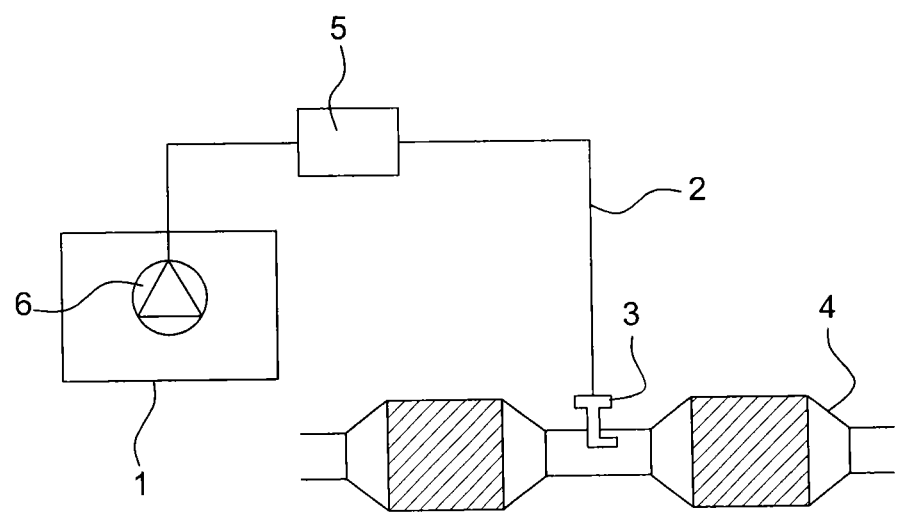
FIG. 1 is a diagram showing an SCR system including a purge device in a particular embodiment of the invention.

FIG. 1 shows an embodiment of an SCR system. The term "SCR system" is used to designate a system for catalytic reduction of NOx in the exhaust gas of an internal combustion engine, preferably a vehicle engine, and using, by way of example, urea as a precursor for liquid ammonia.

In the example of FIG. 1, the SCR system comprises an additive tank 1 containing an aqueous solution of urea with 32.5% by weight of urea (eutectic), a pump 6 arranged inside the tank 1, a purge device 5 connected to the pump 6, and an injection channel 2 (or injection line) going from the purge device 5 to an injector 3 situated in an exhaust pipe 4. Advantageously, the pump 6 is a unidirectional pump. Naturally, in a variant embodiment, the pump 6 could be a bidirectional pump.

In the normal mode of operation (injecting additive), the pump 6 causes additive to flow from the tank 1 to the injector 3 via the purge device 5 and the injection channel 2, with the additive then being injected into the exhaust gas by means of the injector 3. Thus, in the normal mode of operation, the first device 5 is configured to allow the additive that is delivered by the pump 6 to pass to the injection channel 2. While purging, the pump 6 is stopped and the purge device 5 sucks in the additive contained in the injector and the injection channel 2.

A first embodiment of the FIG. 1 purge device 5 is described below with reference to FIGS. 2a to 2d.

Figure 2A:
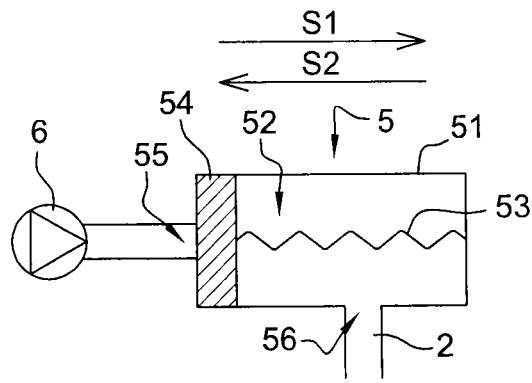
FIGS. 2a to 2d are diagrams showing a first embodiment of the FIG. 1 purge device.

As shown in FIG. 2a, the purge device 5 comprises a housing 51 defining a chamber 52 that receives piston moving equipment (53, 54). The housing 51 has an inlet port 55 and an outlet port 56.

The moving equipment (53, 54) is slidably mounted in the chamber 52. The chamber 52 communicates with the pump 6 via the inlet port 55. The chamber 52 also communicates with the injection channel 2 via the outlet port 56.

The moving equipment (53, 54) is suitable for performing a go stroke in a first sliding direction (represented by the arrow numbered S1) and a return stroke in a second sliding direction (represented by the arrow numbered S2).

In the example of FIG. 2a, the moving equipment comprises a piston 54 slidably mounted in the chamber against a spring 53. The spring 53 has one end secured to the piston 54 and another end secured to the housing 51.

The piston 54 is preferably a sealing piston. In FIG. 2a, the piston 54 occupies a position in which it prevents fluid flow communication between the inlet port 55 and the outlet port 56.

When the pump 6 is put into operation, additive penetrates into the chamber 52 via the inlet port 55 and pushes the piston 54 in the first sliding direction (S1). The movement of the piston 54 in the first sliding direction (S1) causes the spring 53 to contract (the spring accumulates energy).

Figure 2B:
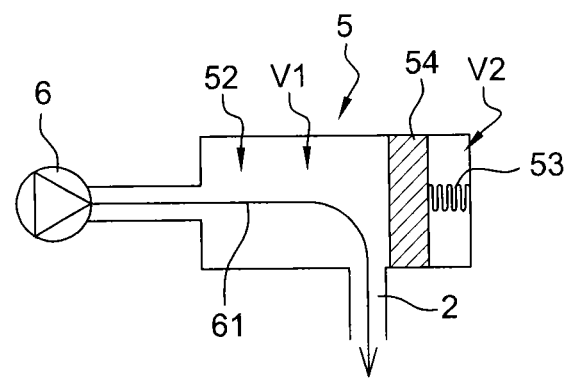

As shown in FIG. 2b, in the normal mode of operation (injecting additive), the piston 54 is moved to a position in which it releases fluid flow communication between the inlet port 55 and the outlet port 56. Additive can thus flow to the injection channel 2 via the chamber 52. The path taken by the additive then consists of a portion of the chamber 52 and the outlet port 56. This additive flow is represented diagrammatically in FIG. 2b by arrow 61. As shown, the spring 53 is compressed and the piston 54 defines a first volume V1 and a second volume V2 in the chamber 52.

In the embodiment shown in FIGS. 2a to 2d, it is assumed that the pump 6 has a leakage rate. For example, at 5 bar the pump 6 may have a leakage rate lying in the range 0.10 liters per hour (L/h) to 0.80 L/h.

In order to initiate purging, the pump 6 is stopped. Since the piston 54 is no longer subjected to the thrust force exerted by delivering additive, the spring 53 tends to return to its original state (the spring restores the energy it has accumulated). The piston 54 is then moved (under drive from the spring) in the second sliding direction (S2). This movement is made possible by the leakage rate of the pump 6. Such a leakage rate allows additive contained in the first volume V1 to return into the tank. This return of additive thus takes place through the pump. The return of additive is represented diagrammatically in FIG. 2c by arrow 62. While the piston 54 is moving in the second sliding direction (S2), the second volume V2 increases while the first volume V1 decreases. The increase in the second volume V2 creates suction within the chamber. Thus, the additive contained in the injection channel 2 returns into the second volume V2 under the effect of the suction.

Figure 2C:
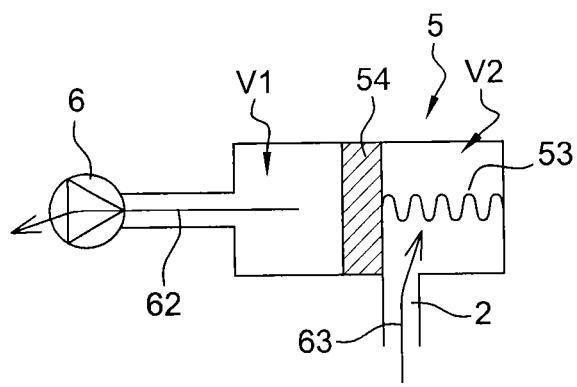

This return of additive is represented diagrammatically in FIG. 2c by arrow 63.

Figure 2D:
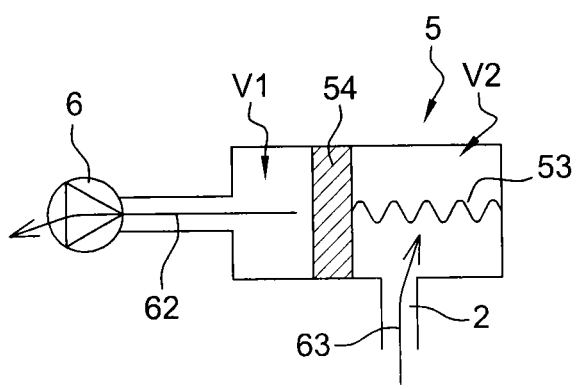

Thereafter, the injector is opened. As shown in FIG. 2d, the piston 54 then continues to move in the second sliding direction (S2) and the suction within the chamber continues. Air is thus sucked into the injector and also into a portion of the injection channel 2. The volume of air that is sucked in is substantially equal to the volume V1 swept by the piston 54. The air suction flow rate is substantially equal to the leakage rate of the pump 6.

A second embodiment of the FIG. 1 purge device 5 is described below with reference to FIGS. 3a to 3d.

Figure 3A:
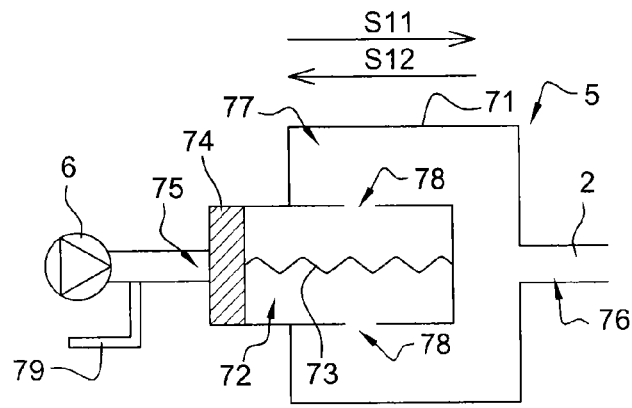
FIGS. 3a to 3d are diagrams showing a second embodiment of the FIG. 1 purge device.

As shown in FIG. 3a, the purge device 5 comprises a housing 71 having an inlet port 75 and an outlet port 76. The housing 71 has a first chamber 72 that receives piston moving equipment (73, 74).

The moving equipment comprises a piston 74 slidably mounted in the first chamber 72 against a spring 73. The piston 74 is suitable for performing a go stroke in a first sliding direction (represented by the arrow numbered S11), and a return stroke in a second sliding direction (represented by the arrow numbered S12). The first chamber 72 communicates with the pump 6 via the inlet port 75. The housing 71 also has a second chamber 77. A portion of the first chamber 72 extends inside the second chamber 77. The first chamber 72 communicates with the second chamber 77 via orifices 78. The second chamber 77 communicates with the injection channel 2 via the outlet port 76. In a variant embodiment, the second chamber 77 may also be a portion of the injection channel 2.

In the embodiment shown in FIGS. 3a to 3d, it is assumed that the SCR system has a bypass line 79 enabling additive to return into the tank. The bypass line 79 is provided with a calibrated orifice (not shown).

In this second embodiment, the pump 6 may also have a leakage rate. Alternatively, the pump 6 need not have a leakage rate.

The piston 74 is preferably a sealing piston. In FIG. 3a, the piston 74 occupies a position in which it prevents fluid flow communication between the first chamber 72 and the second chamber 77.

When the pump 6 is put into operation, additive penetrates into the first chamber 72 via the inlet port 75 and pushes the piston 74 in the first sliding direction (S11). The movement of the piston 74 in the first sliding direction (S11) causes the spring 73 to shrink (the spring accumulates energy).

Figure 3B:
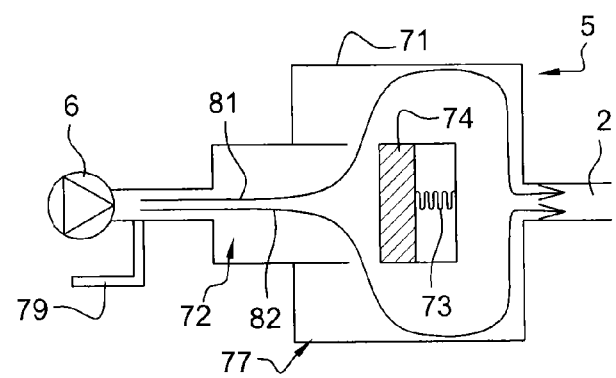
Figure 3C:
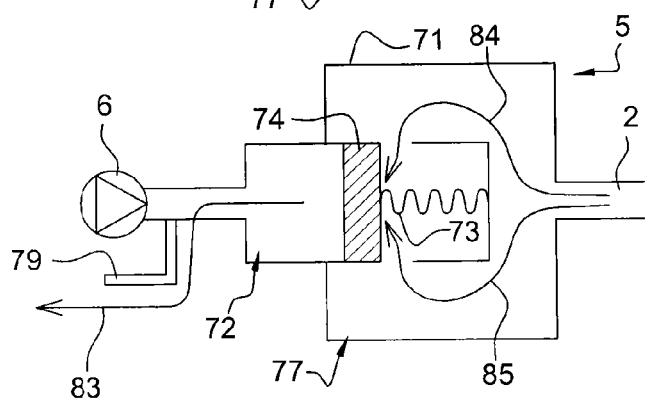

As shown in FIG. 3b, in the normal mode of operation (injecting additive), the pump 6 (which is in operation) delivers additive from the tank. The piston 74 is subjected to a thrust force exerted by the delivery of additive. The piston 74 is then moved in the first sliding direction (S11). The piston 74 is moved to a position in which it releases fluid flow communication between the first chamber 72 and the second chamber 77. Additive can thus flow to the injection channel 2 via the first and second chambers 72 and 77. The passage followed by the additive then consists of a portion of the first chamber 72, the orifices 78, a portion of the second chamber 77, and the outlet port 76.

This flow of additive is represented diagrammatically in FIG. 3b by arrows 81 and 82. As shown, the spring 73 is compressed.

In order to initiate purging, the pump 6 is stopped. Since the piston 74 is no longer subjected to the thrust force exerted by delivering additive, the spring 73 tends to return to its original shape (the spring restores the energy it has accumulated). The piston 74 is then moved (under thrust from the spring) in the second sliding direction (S12). This movement is made possible by the bypass line 79. Such a bypass line 79 allows the additive contained in the first chamber 72 to return to the tank (assuming that the pump 6 does not have a leakage rate). This return of additive is presented diagrammatically in FIG. 3c by arrow 83.

The movement of the piston 74 in the second sliding direction (S12) creates suction within the purge device. Thus, the additive contained in the injection channel 2 returns into the purge device. This return of additive is represented diagrammatically in FIG. 3c by arrows 84 and 85.

Figure 3D:
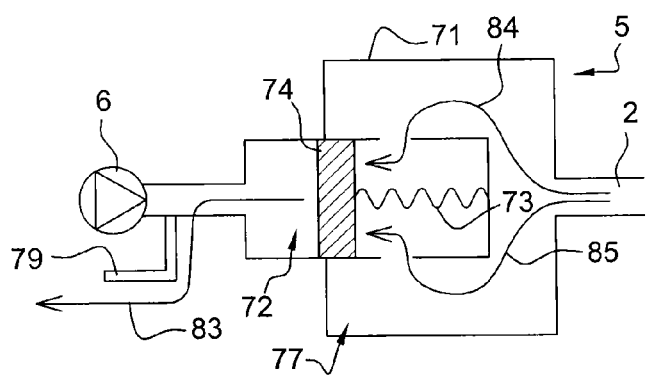

Thereafter, the injector is opened. As shown in FIG. 3d, the piston 74 then continues to move in the second sliding direction (S12) and additive continues to be sucked into the purge device. In this way, the injection channel and the injector are purged effectively and automatically (i.e. without any control signal).

Compared with known purge devices for systems of this type, the purge device of the invention uses mechanical means of great simplicity, that are inexpensive and reliable.

What is claimed is:

1. A system, comprising:
    a tank for storing an additive, an injector, and a pump for driving the additive from the tank to the injector via an injection channel; and
    a passive purge device which operates without any electrical power supply or any control signal from a computer or a control unit, and which is mounted between the pump and the injection channel;
    wherein:
    the passive purge device comprises a chamber and piston moving equipment slidably mounted in the chamber;
    the passive purge device is adapted to function such that
        movement of the piston moving equipment in a first sliding direction causes a passage to open into the chamber for passing the additive to the injection channel, and
        movement of the piston moving equipment in a second sliding direction creates suction within the chamber, which causes at least some of the additive contained in the injection channel to return into the chamber, such that the movement of the piston moving equipment in the second sliding direction closes the passage; and
    the system is adapted for storing and injecting the additive into exhaust gas from an internal combustion engine.

2. The system according to claim 1, wherein the movement of the piston moving equipment in the second sliding direction is initiated firstly by stopping the pump, and then by opening the injector.

3. The system according to claim 1, wherein
    the piston moving equipment comprises an assembly comprising a piston and a spring, and
    the piston is mounted to slide in the chamber against the spring.

4. The system according to claim 3, wherein the assembly is dimensioned in such a manner that pulsations generated by at least one of the pump and the injector are compensated.

5. The system according to claim 1, further comprising:
    an additive return circuit enabling the additive in the chamber to return into the tank when the piston moving equipment moves in the second sliding direction.

6. The system according to claim 5, wherein the pump has a leakage rate.

7. The system according to claim 5, wherein the additive return circuit comprises a bypass line.

8. The system according to claim 1, wherein the pump is a unidirectional pump.

9. The system according to claim 1, wherein the additive is an aqueous solution of urea.

10. A method of storing and injecting an additive into an exhaust pipe of an internal combustion engine, said method comprising:
    driving the additive stored in a tank to an injector with a pump and via an injection channel;
    injecting the additive into the exhaust pipe with the injector; and
    purging the injection channel in a passive way by moving piston moving equipment that is slidably mounted in a chamber, said purging occurring without any electrical power supply or any control signal from a computer or a control unit,
    wherein:
    movement of the piston moving equipment in the chamber creates suction within the chamber, thereby causing at least some of the additive in the injection channel to return into the chamber;
    movement of the piston moving equipment in a first sliding direction opens a passage in the chamber for passing the additive to the injection channel; and
    movement of the piston moving equipment in a second sliding direction causes the passage to be closed.

11. The method according to claim 10, wherein said purging comprises the following in succession and in this order:
    a) starting the pump in order to move the piston moving equipment in the first sliding direction;
    b) stopping the pump so as to allow the piston moving equipment to move in a second sliding direction; and
    c) opening the injector to admit air into the injection channel, so that the piston moving equipment continues to move in the second sliding direction and some of the additive in the injection channel is sucked into the chamber.

* * * * *